July 22, 1952  H. M. TUCKER  2,603,884
ELEMENTARY INDUCTION COIL INSTRUCTION DEVICE
Filed Dec. 19, 1949  5 Sheets-Sheet 1

INVENTOR.
HARRY M. TUCKER
BY
ATTORNEYS

July 22, 1952 — H. M. TUCKER — 2,603,884
ELEMENTARY INDUCTION COIL INSTRUCTION DEVICE
Filed Dec. 19, 1949 — 5 Sheets-Sheet 3

INVENTOR.
HARRY M. TUCKER
BY
ATTORNEYS

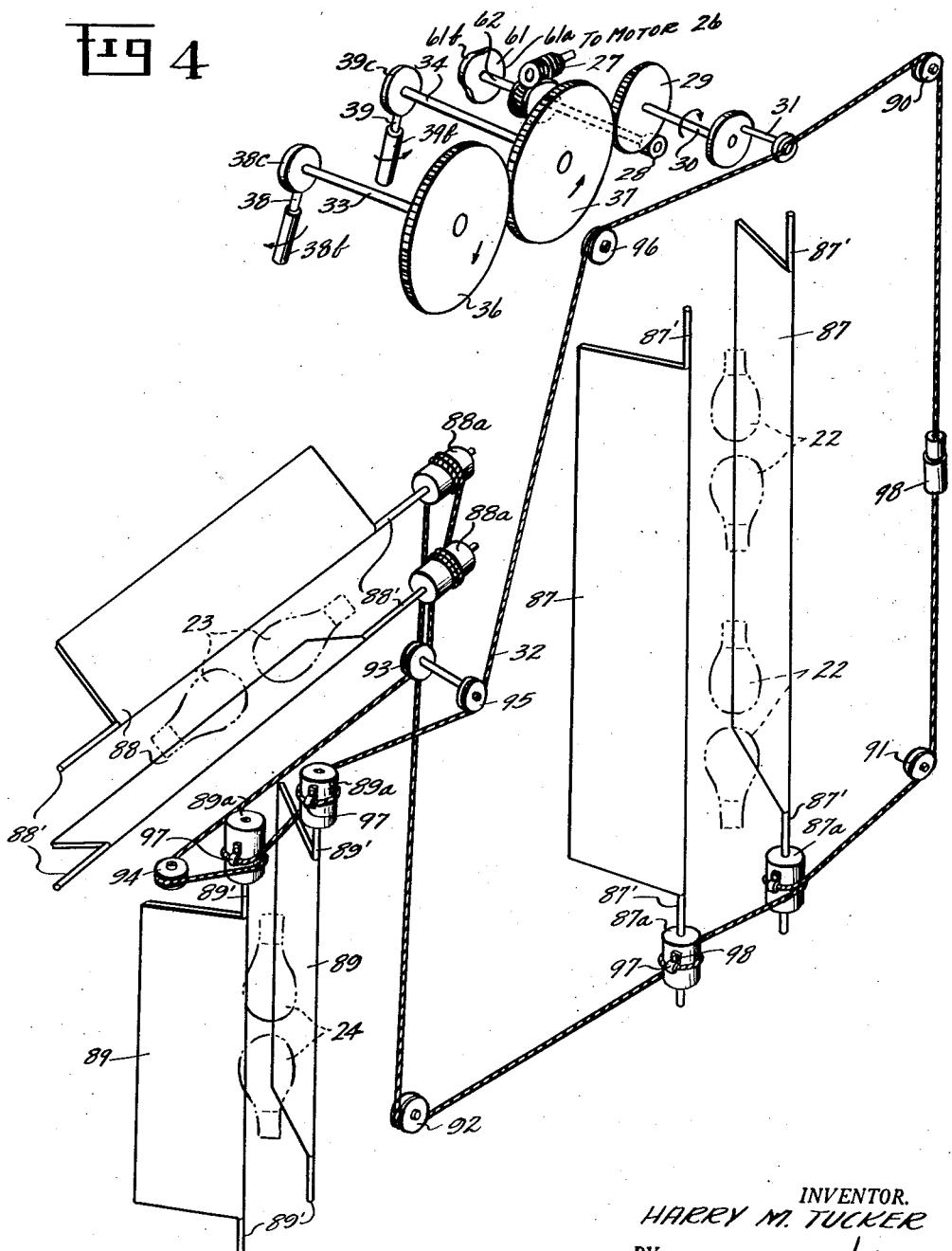

July 22, 1952          H. M. TUCKER          2,603,884
ELEMENTARY INDUCTION COIL INSTRUCTION DEVICE
Filed Dec. 19, 1949          5 Sheets—Sheet 5
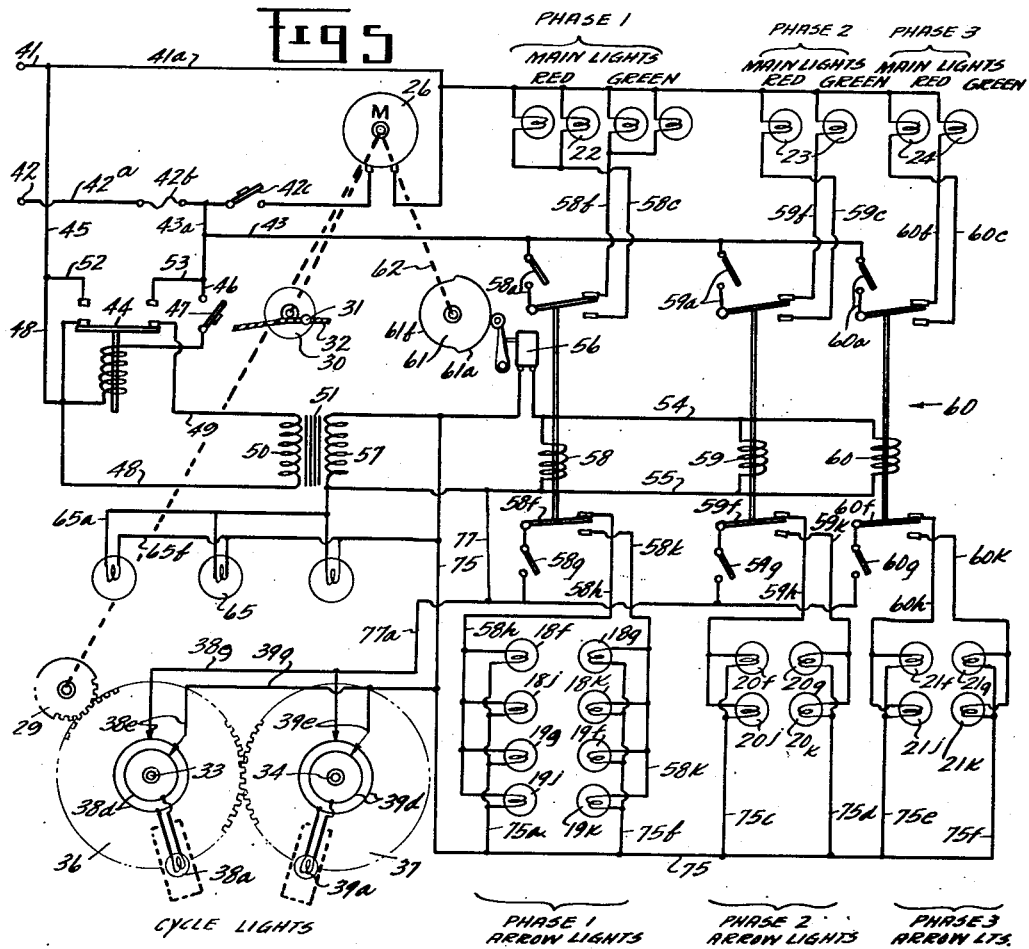
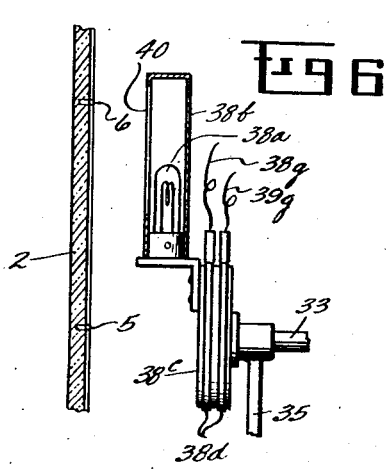
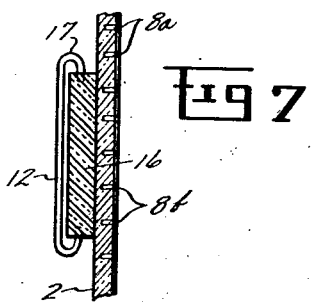
INVENTOR.
HARRY M. TUCKER
BY
ATTORNEYS Patented July 22, 1952

2,603,884

UNITED STATES PATENT OFFICE 2,603,884

ELEMENTARY INDUCTION COIL INSTRUCTION DEVICE

Harry M. Tucker, Dayton, Ohio

Application December 19, 1949, Serial No. 133,921

7 Claims. (Cl. 35—19)

(Granted under the act of March 3, 1883, as amended April 30, 1928; 370 O. G. 757)

The invention described herein may be manufactured and used by or for the Government for governmental purposes without payment to me of any royalty thereon.

This invention relates to educational devices and trainers generally, and more particularly to an elementary induction coil instruction device for presenting visually and in motion the principles and theory of an electrical inductance in elementary inductance coils and all electric applications related thereto, and is especially adaptable for use as a class room trainer where principles and phenomena relating to electrical inductance are being taught.

An object of the invention is the provision of a trainer device having a plurality of simulated electric induction coils thereon, and utilizing illuminated means for simulating the lines of flux and their relation between spaced induction coils, both when their axes are disposed in alignment, and when they are normal to each other.

A further object is the provision of an illuminated "animated" trainer device utilizing different colors for illustrating the positive and negative current values or cycles of a simulated alternating current, for instance, red indicating the positive cycle and green indicating the negative cycle.

A further object is the inclusion of an animated illuminated cycle curve, illustrating one complete alternating current cycle, the positive, or above the line portion of the curve being illuminated in red while the negative, or below the line, portion is illuminated in green, together with similarly colored pointer or arrow indicating means associated with the depicted or simulated induction coils for showing corresponding current flow, and direction of current flow, both actual and induced, together with illuminated depictions of the flux fields between the simulated coils.

A further object is the provision of an animated illuminating means for illustrating and simulating the decay and interruption of the flux fields associated with the inductance coils as the simulated alternating current cycle changes from negative to positive, or from positive to negative.

A still further object of the invention is the provision of a voltage curve illustrating a positive-negative alternating current cycle in which movable illuminating means are provided to sweep the voltage curve from one end to the other causing a progressing illumination of the positive portion of the curve in one color, for instance red, and a continued progressive illumination of the negative portion of the curve in a different color, for instance, in green.

A further object is the provision of a trainer device having a casing containing the entire operating mechanism with a viewing front surface formed of opaque material having light opening or perforations extending therethrough for illumination of the induction coils, the extent of the lines of flux the associated voltage curve, and the direction of current flow through the simulated induction coils.

Other objects and advantages of the invention will become apparent from the following description, taken in connection with the accompanying drawings in which like reference characters refer to like parts in the several figures.

In the drawings:

Figure 4 is a somewhat diagrammatic perspective view, illustrating the reeving arrangement of the shutter operating cable;

Figure 5 is a wiring diagram of the device;

Figure 6 is a detail sectional view showing the sweep light construction; and

Figure 7 is a detail vertical sectional view through one of the simulated induction coils.

Figure 1:
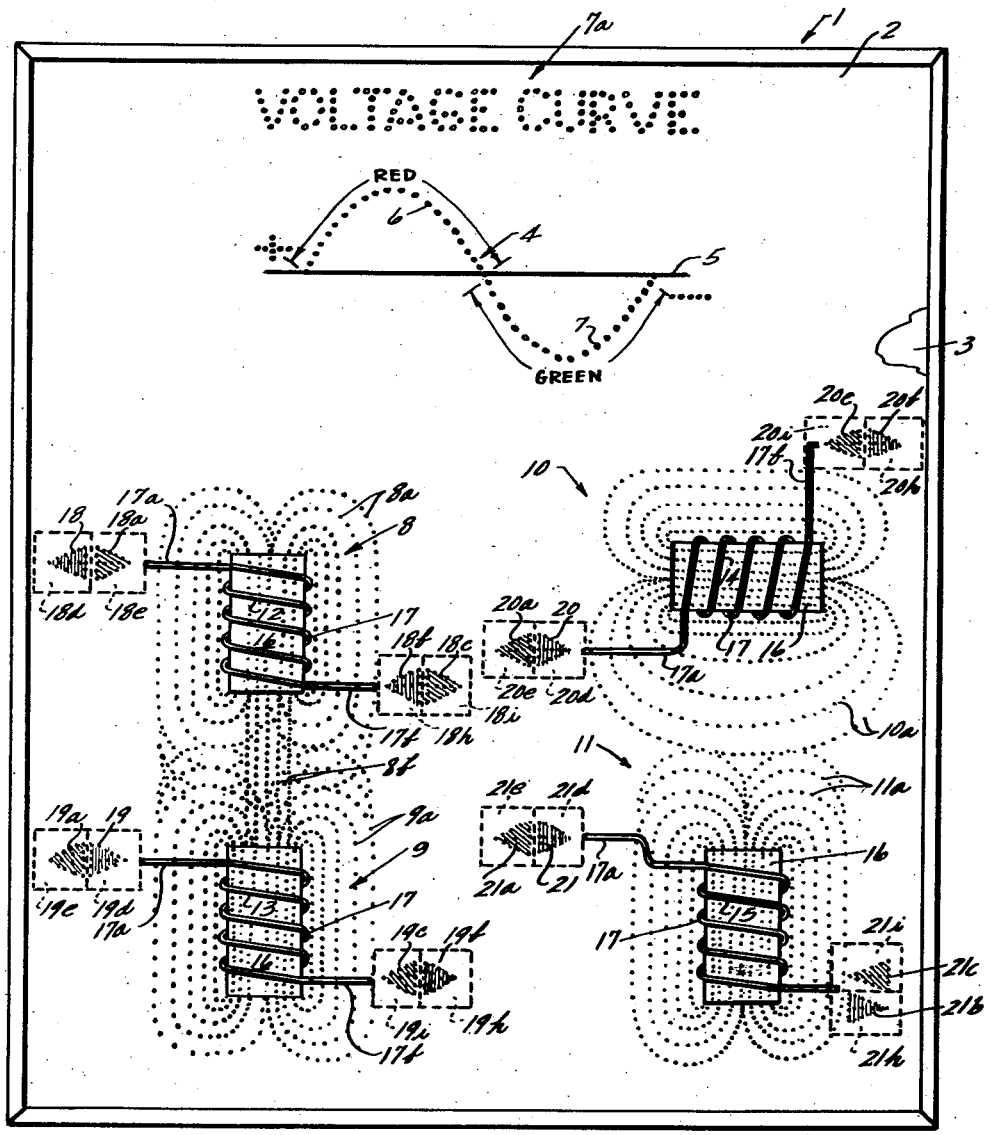
Figure 1 is a front elevation of the elementary induction coil instruction device or demonstrating trainer apparatus.

Referring primarily to Figure 1 of the drawings the reference numeral 1 denotes a rectangular cabinet or box structure having a rectangular opening in is front face in which is fitted a main supporting panel 2. The panel 2 is preferably made of suitable transparent material and treated on its rear face so that illumination from the rear is permitted only in portions where the treatment has been omitted for the specific purpose of attaining desired lighting effects. In the illustration shown in the drawing the panel 2 is made of a "Plexiglas" sheet which is painted and then perforated part way through with a small drill along a predetermined outline or design so that the illuminating means will shine through the holes to light up the design. If desired, a thin transparent sheet or panel of "Plexiglas" 3 or suitable colored take may be placed behind the perforated panel with colored portions covering certain of the perforated areas to provide a greater contrast, such as red to indicate a positive cycle of current and green to indicate a negative current cycle, and colored lights behind the panel 2 may also be used instead. Shading in the drawings denotes color.

At the top portion of the panel a "voltage curve" or A. C. wave indicator is indicated at 4 having a zero axis 5 with plus and minus indicating portions 6 and 7 of the sine wave located respectively, above and below the zero axis line 5. A pair of inter-geared sweep lamp devices operate behind the curve as will be later described to provide a progressive illumination of the voltage curve 4 from left to right, from one end to the other. The voltage curve is formed by a line of perforations extending through the panel following the curve while the zero axis 5 is a transparent or semi-transparent line on the rear of the panel 2 where the opaque material at the back of the panel has been drilled or scraped away. The rear of the panel 3 is colored red and green respectively behind the perforation of the sine wave or voltage wave, above and below the zero axis 5 as indicated, such as by colored "cellophane" tape. The legend "Voltage Curve" is also formed by small perforations as indicated at 7a, drilled from the back partly through the panel with suitable electric lamps 65 in lamp boxes located behind the panel 2.

Simulated induction coils are indicated respectively at 8, 9, 10 and 11, each having a simulated coil winding 12, 13, 14 and 15. The coils and windings are similarly constructed, each comprising a rectangular block of clear or translucent plastic sheet material, such as "Plexiglas," indicated at 16 having holes drilled in the opposite edges in somewhat transverse staggered relation for receiving the ends of polished heavy copper or brass wire clips 17, 17a and 17b. The clips 17 form the simulated body windings of the coils while the clips 17a and 17b constitute the ends of the windings.

In the left hand induction coil depiction on the panel (Fig. 1), the simulated coils 8 and 9 are disposed sufficiently close to each other, and in axial alignment, so that their flux fields will overlap, illustrating a simulated induced current in one coil while the other is shown as being energized. It might be noted that the flux fields are also depicted by the lines of perforations 8a and 9a drilled through the opaque backing and partly through the panel as shown in drawings in Fig. 7. Since the lines of flux overlap there is provided a second group of "straight" or parallel partly drilled perforations 8b extending from the back of the panel between the two coils 8 and 9, and behind the coil simulating blocks 16. Red and green electric lamp illuminating means are disposed behind this portion of the panel and are alternately controlled by means of shutters and relays later to be described.

On the right hand portion of the panel are simulated two induction coils 10 and 11, disposed adjacent each other but with their axes perpendicular to each other, the flux lines or inductance fields being depicted by the lines of force or rear perforations 10a and 11a which do not interfere or cross each other to produce induced currents in one of the coils 10 (or 11) when the other coil 11 or 10 is energized.

Located adjacent each end of each of the simulated windings of the coils 8, 9, 10, and 11 is a pair of red and green pointers which point in opposite directions. They are denoted at 18—18a, 18b—18c; 19—19a; 19b—19c; 20—20a; 20b—20c; and 21—21a; 21b—21c. These pointers are each formed by lines or groups of perforations extending through the rear coating of the panel 2 forming the arrow, the back panel being preferably colored red with red "cellophane" tape behind the pointers 18—18b; 19—19b; 20—20b; 21—21b and colored green behind the pointers 18a—18c; 19a—19c; 20a—20c; 21a—21c, red indicating a simulated positive current, and green the negative current, passing through the coils 8 to 11. In the simulated inductance coils 8 and 9 the colors of the pointers which point in the same directions are contrasting, to depict an induced current of opposite polarity in one coil when the other coil is energized. For instance, when the red arrows 18 and 18b are simultaneously illuminated indicating the passage of a positive current through the winding 12 from the lower right to upper left, the green pointers 19a and 19c are simultaneously illuminated from behind, depicting an induced negative current, passing from lower right to upper left through the winding 13 of the coil 9. Each of the arrow pointers is provided with a separate electric lamp box located behind the panel, for individually illuminating the respective pointer.

Figure 2:
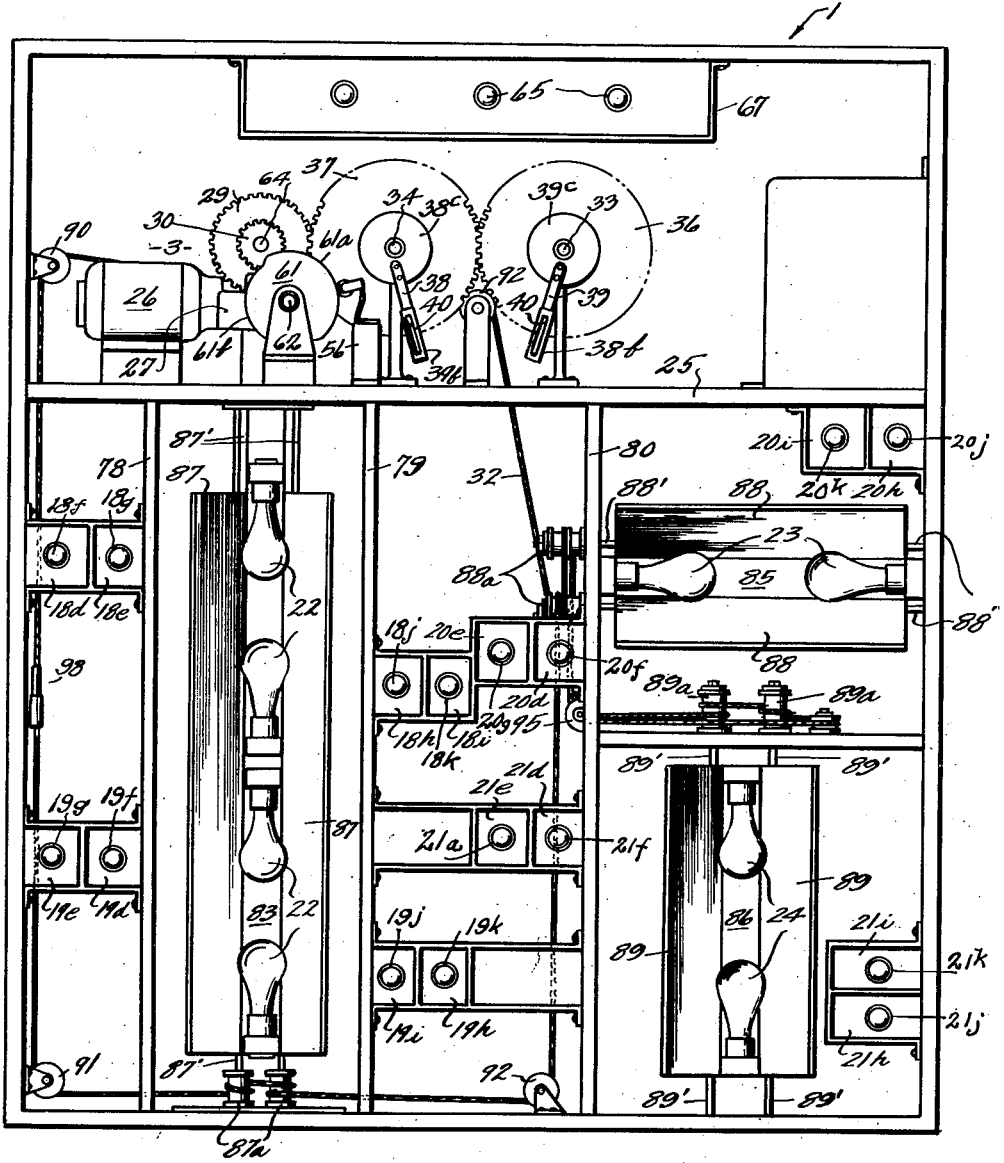
Figure 2 is a similar view, but with the front panel removed.

Referring to Figure 1, and to Figure 2 which illustrates the interior of the cabinet with the panel removed, the individual lamp boxes behind the pointers 18 and 18b are indicated at 18d and 18h, respectively, each containing one of the lamps 18f and 18j, while boxes 18e and 18i are illuminated by lamps 18g and 18k which are located behind the pointers 18a and 18c, respectively. Lamp boxes 19d and 19e, and 19h, 19i, are disposed respectively behind the pointers 19, 19a, 19b, 19c, each having a lamp 19f, 19g, 19k and 19j therein. The wiring diagram in Figure 5, later to be described shows the circuit arrangement of these pointer illuminating lamps as well as the other illuminating means, relays, and wiring circuits.

The pointers 20, 20a, 20b, 20c and 21, 21a, 21b, 21c, respectively, are disposed in front of lamp boxes 20d, 20e, 20h, 20i and 21d, 21e, 21h, and 21i, each box containing, respectively, lamp 20f, 20g, 20j, 20k and lamp 21f, 21g, 21j, 21k. Located directly behind the "coils" 8 and 9, and behind the apertures 8a, 9a and 8b to simulate the flux field, are a set of four electric lamps as indicated at 22, one red and one green behind each coil 8 and 9. Similarly located behind the panels 2 and 3 so as to project light rays through the flux indicating apertures 10a and 11a are two pairs of lamps indicated respectively at 23 and 24, one of each pair being red and the other green.

Figure 3:
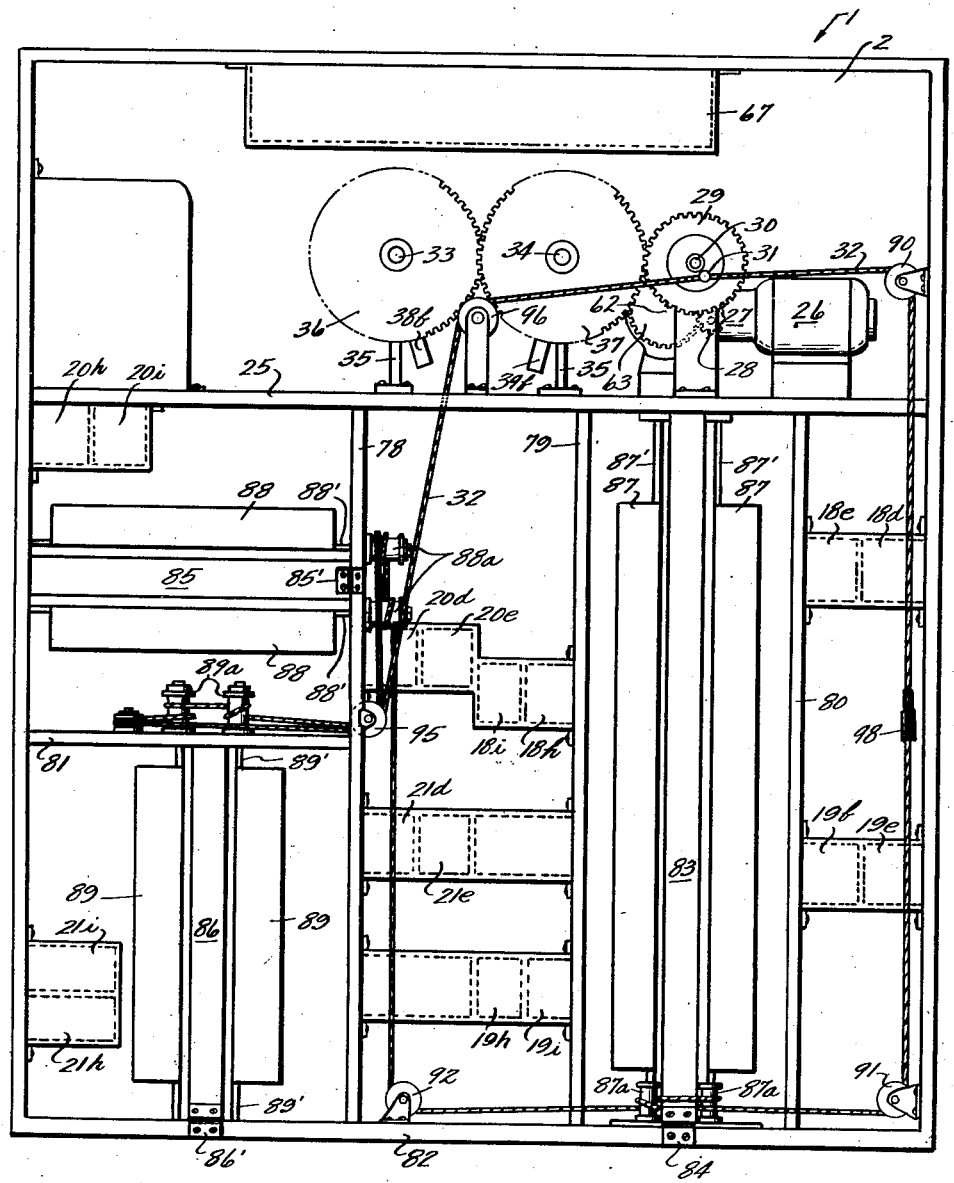
Figure 3 is an elevation of the rear of the device open.

Referring to Figures 2 and 3 the interior of the cabinet is provided with a horizontal shelf 25 on which is mounted an electric motor 26 having a reduction gear unit 27 therein which drives a pinion gear 28 meshing with a larger pinion gear 29 mounted on a shaft 30, journaled on suitable bearings carried by the shelf 25. The shaft 30 has a crank member 31 fixed thereto for reciprocating a cable 32 which actuates a plurality of shutters for the lamps 22, 23 and 24, later to be described.

Located directly behind the centers of the voltage curves 4 are a pair of parallel horizontal shafts 33 and 34, carried by standards 35, fixed on the shelf 25. The shafts 33 and 34 have fixed thereon a pair of large intermeshing pinion gears 36, 37 one of which meshes with the drive pinion 29, so that the shafts 33 and 34 will be uniformly driven in opposite directions with their "upper" peripheries moving toward each other. The pinion 29 is one-half the diameter of the sweep lamp gears 36 and 37 so as to give the crank 31 two revolutions to one of the larger sweep lamp gears 36, 37. Fixed to and projecting radially from the shafts 33 and 34 are a pair of sweep lamp supports or arms 38 and 39 having electric lamps 38a—39a fixed thereon and inclosed by receptacles or cams 38b, 39b each formed with a light slit 40 therein to sweep the rear of the voltage curve 4. One of the lamps sweeps the upper or positive portion 6 of the curve 4 from the left hand end to the center while the other lamp continues and sweeps the other lower or negative portion 7 of the voltage curve from center to right hand end, thus progressively illuminating the voltage curve from the left to right, simulating one positive-negative alternation of current passing through the windings of the simulated induction coils 8, 9, 10 and 11. The sweep lamps 38a and 39a respectively each have a rotary electrical contact supporting disk 38c, 39c carrying spaced annular contact strips 38d and 39d, Fig. 6, which are connected to the terminals of the sweep lamps 38a, 39a. Brush contacts 38e and 39e are fixed on the shelf 25 and wipe the contacts 38d and 39d as the sweep lamps swing around the axes of the shafts 33 and 34 (see Fig. 6). Suitable electrical conduit wires 38g and 39g are connected to stationary contact brushes 38e and 39e which are carried by the shelf 25 and wipe the respective contact strips 38d and 39d.

Referring to the wiring diagram (Figure 5) the current source terminals are indicated at 41 and 42, the terminal 41 having a conductor 41a to which one side of each of the phase lamps I, II and III denoted at 22, 23 and 24 are connected. One terminal of the motor 26 is also connected to this conductor 41a. The terminals 41 and 42 are adapted to be connected to a 110 v. current source, the terminal 42 being connected by a conductor 42a to the other terminal of the motor 26 with a fuse 42b and motor switch 42c interposed therein. A conductor 43 is connected to 42 between the fuse 42b and switch 42c by short conductor 43a, and a starting relay 44 is provided having its terminals connected respectively by conductors 45 and 46 to the main conductors 41 and 43, with a starting switch 47 interposed in the conductor 46. Closing of the switch 42c starts the motor 26, while closing the switch 47 energizes the relay 44 and connects the conductors 48 and 49, which lead to the primary terminals 50 of a transformer 51, respectively to the conductors 45, main conductors 41 and 42 through 43, through conductors 52 and 53.

The transformer 51 supplies a lower voltage or current, for instance 25 v., to the conductors 54 and 55. The conductor 54 has a single pole single throw microswitch 56 therein for closing and for interrupting the electric circuit to the secondary 57 of the transformer 51. Relays of the double pole double throw type are indicated at 58, 59, 60. When the microswitch 56 is closed the relays 58, 59, 60 are energized and move to one position, as shown, closing the circuits respectively through the manual switch controlled conductors 58a, 59a and 60a and 58b, 59b and 60b to a pair of the lamps 22 for instance green color, and one each of the pairs of lamps 23 and 24, for instance green color. When microswitch 56 is opened or released the relays 58—59 and 60 are spring returned and also energize and close the circuits respectively through conductors 58a, 59a and 60a and 58c to the other pair of the 110 v. lamps 22 and the other 110 v. lamp of each of the pairs of lamps 23 and 24, for instance the red lamps.

The microswitch actuator comprises an annular cam 61 having a 180° high portion 61a, and a 180° low portion 61b. The cam 61 is fixed on a shaft 62 having a drive gear 63 fixed thereon which meshes with a drive gear 64 fixed on the shaft 30 that carries the crank 31, so that the crank and microswitch operate simultaneously and in timed relation unison.

The Voltage Curve legend lamps 65 are connected in parallel by conductors 65a and 65b and 75, respectively, to the low voltage conductors 54 and 55, are mounted in a suitable lamp box 67 behind the legend 7a, and burn continuously when switch 47 is closed.

The pointer or current direction and phase indication arrow lamps are also connected in groups in parallel, as shown in the wiring diagram in Figure 5. The lamp group or series 19+ is controlled by the relay 58, the group or series 20+ by relay 59, and the group or series 21+ by the relay 59. With respect to each relay, when the relay circuit is opened one group of lamps is lit and when relay circuit is closed that group of lamps is extinguished and the other group is lit.

The electrical conductor 75 connects one terminal of each of the red and green pointer lights to one output terminal of the transformer 51 through the conductors 75a, 75b, 75c, 75d, 75e and 75f. A conductor 77 is connected at one end to conductor 55 from transformer secondary 57 and is connected by conductor 77a to one of the wires 38g for the sweep lights 38a while the other wire 38g is connected to the conductor 75.

The lower or second poles or contact members of the relays 58, 59 and 60 are indicated at 58f, 59f and 60f and are connected respectively to the conductor 77 by short conductors 58g, 59g and 60g, each having a manual single pole single throw switch therein, as shown in the wiring diagram so as to selectively and individually simulate the energizing of the induction coils 8 and 9, or 10, or 11.

When relays are open, the contacts 58f, 59f and 60f close the circuit to conductors 58h, 59h and 60h thus lighting lamps 18f, 18j, 19g, 19j of the first group, lamps 20f, 20j of the second group, and lamps 21f and 21j of the third group, simultaneously illuminating the red arrows 18 and 18b and green arrows 19a and 19c associated with the simulated coil windings 12 and 13, together with the red arrows 20 and 20b associated with the simulated winding 14, and the red arrows 21 and 21b associated with the winding 15. This occurs during a one-half revolution of the cam 61, and while the sweep lamp 38a is sweeping and illuminating the upper reach or positive portion 6 of the voltage curve 4. The red arrows 18 and 18b illustrate that a positive current is passing through the coil 8 while the red arrows 20, 20b and 21, 21b, indicate that positive current is passing through the coils 10 and 11. The flux fields are also illuminated in red color at this time by the red 110 v. main lights or lamps 22, 23 and 24 (the shutters being open), illuminating the flux lines or perforations 8a, 9a and lines 8b, simulating the overlapping flux fields of the induction coils 8 and 9. The green arrows 19a and 19c associated with winding 13 are illuminated and illustrate or simulate an induced (negative) current in the winding of the lower aligned induction coil 9. Red arrows 20, 20b associated with the coil 10, and the red arrows 21, 21b associated with the coil 11 and the non-interfering flux lines 10a and 11a when illuminated indicate that a positive current is passing in the coils 10 and 11 in the directions of the arrows but that no interference or induced currents are present between or in the coils 10 and 11 when disposed perpendicular to each other.

When the microswitch cam 61 is rotated 180° the microswitch 56 is closed, energizing the relays 58, 59 and 60 to close the circuits through the conductors 58k, 59k and 60k to illuminate the respective lamps 18g, 18k for green arrows 18a and 18c, and lamps 19f, 19k for red arrows 19 and 19b, also illuminating lamps 20g and 20k for green arrows 20a and 20c associated with simulated induction coil 10, and lamps 21g and 21k for green arrows, 21a and 21c associated with simulated induction coil 11. As this change takes place the sweep light 38a, rotating clockwise passes off of the upper or positive portion 6 of the voltage curve 41 and behind the opaque portion of the front panel while the right hand sweep light 39, rotating counter-clockwise, rotates downwardly behind the lower negative or green portion 7 of the voltage curve to illuminate the same indicating the negative portion, or alternation, or cycle of the current is passing through the induction coils 8, 10 and 11, and that an induced current of opposite polarity is induced in the windings 13 of the induction coil 9.

The respective simulated flux fields are 8a, 8b, 9a, 10a and 11a and are illuminated green at this time, but between the "change over" or alternation of the flux field from plus to minus it "decays" and is interrupted momentarily, and then built up. The shutter control mechanism is for the purpose of simulating this effect and will now be described.

Referring more particularly to Figures 2, 3 and 4 the cabinet contains vertical batons or strips 78, 79 and 80 and horizontal batons 81 and 82. A supporting strip 83 is hinged at 84 to the baton 82 and extends upwardly to the shelf 25. This hinged lamp supporting strip 83 carries the four 110 v. lamps 22 thereon, one red and green pair behind the simulated coil 8 and one red and green pair behind the simulated coil 9. When the strip is swung outwardly on the hinge 84 through the rear opening in the cabinet any burnt out bulbs 22 can conveniently and easily be replaced.

Similar lamp mounting hinged strips 85 and 86 hinged at 85' and 86' provide lamp supports for, and permits the replacement respectively of, the 110 v. flux field illuminating pairs of red and green lamps 23 and 24. As before mentioned the 110 v. lamps illuminate the area of the holes or perforations behind the panel which are associated with the simulated induction coils and depict the induction coil flux fields. The upper red and green lamps 22 illuminate the flux field 8a, the lower red and green lamps 22 illuminate the flux field 9a, with the center two lamps 22 also illuminating the straight line perforations 8b between the coils 8 and 9. The red and green lamps 23 illuminate the flux field perforations 10a while the red and green lamps 24 illuminate the flux line perforations 11a.

In order to simulate the diminution or decay and subsequent build up of the flux lines as the simulated alternating current passes through the respective coil windings 12 or 13, 14 and 15 pairs of shutters 87, 88 and 89, fixed on operating pivot shafts 87', 88', 89' are journaled respectively in the shelf 25 and lower baton 82, in the vertical baton 78 and side wall of cabinet, and in the horizontal baton 81 and bottom baton 82. The shutters swing from open positions at the opposite sides of the respective lamps 22, 23 and 24 to abutting or closed positions between these lamps and the rear face of the front panels 2 of the display apparatus to interrupt all light to the perforations 8a, 9a, 8b, 10a and 11a. As the shutters open the simulated lines of force are gradually illuminated outwardly away from the axes of the coils and as they close these lines of force are gradually darkened inwardly toward the axes of the coils to indicate the "decay" of the flux.

The shutters are all oscillated continuously and simultaneously between open and closed positions by the cable 32 and the crank 31 which is driven by the shaft 30. Since the crank 31 rotates at twice the speed of the sweep lamps 38a, 39a (due to drive pinion 29 being one-half the diameter of the sweep gears), the shutters are opened and closed for each half cycle or semi-revolution of the sweep lamps. They open at the beginning of the illumination of the positive portion 6 of voltage curve, then close at the end 6, opening again at the beginning of the portion 7 of the voltage curve 4, closing again at the end of the voltage curve portion 7.

Each of the shutters is fixed on one of the pivot shafts 87', 88', 89' which carries a cable drum 87a, 88a, 89a which is fixed on each shaft. The cable 32, as best seen in Figure 4, is preferably endless and extends from the crank 31 around pulleys 90 and 91 at the upper and lower side portions of the cabinet, is then wound clockwise around first shutter drum 87a, then counterclockwise around the other drum 87a, passes around pulley 92 and upwardly, being first wound clockwise around the upper shutter drum 88a, then downwardly and counterclockwise around the other drum 88a, passing over horizontally spaced pulleys 93 and 94. The cable 32 is then wound clockwise around the nearest shutter drum 89a as shown, and then counterclockwise around the other or second drum 89a. The cable then passes over a pair of vertically spaced pulleys 95 and 96 and returns to the crank member 31. Rotation of the crank 31 reciprocates the endless cable 32, oscillating each pair of the cable drums fixed to the shutter shafts, which in turn oscillate all of the pairs of shutters simultaneously and uniformly in opposite directions between open and closed positions.

In order to initially adjust the positions of the shutters and also prevent slippage of the cable portions which are reversely wound around the pairs of shutter operating cable drums 87a, 88a and 89a, each drum is provided with a cable clamp member or clip 97, having a clamping screw 98 for drawing the clamp members 97 down tight on the cable. A turnbuckle 98 is inserted in the length of the endless cable 32 to provide adjustment for stretch and proper tension of the cable and elimination of slack.

What I claim is:

1. In an elementary electric inductance coil demonstration device for visually demonstrating the principles and theory of elementary inductance coils, an opaque backed supporting panel, a plurality of simulated translucent inductance coils mounted on the panel adjacent each other including at least one pair of coils mounted in axial alignment and a second pair disposed adjacent each other with their axes perpendicular to each other, a simulated electrical winding for each coil having its opposite ends adjacent the opposite ends of the coil, light transmitting perforations formed through the opaque backed portion of the panel on lines depicting simulated lines of flux surrounding the coils, passing through the coils, and extending substantially parallel between the aligned coils, illuminating means supported in rear of the panel substantially in rear of each of the simulated coils for projecting light rays through said perforations to illuminate the perforations, movable shutter means supported in rear of the panel between the illuminating means for the perforations and the panel, shutter actuating means connected to all of the shutter means for simultaneous and uniform actuation thereof between open and closed positions, an alternating current voltage curve depiction on the panel for depicting one alternating current cycle, and movable illuminating means for progressively illuminating the voltage curve from one end to the other, including means connected to the shutter actuating means for actuation thereof for opening and closing said shutters twice during the progressive illumination from one end to the other of the said voltage curve.

2. Apparatus as claimed in claim 1, in which the rear of the panel is perforated adjacent the ends of the simulated windings to form a plurality of pointers for depicting the direction of simulated current flow and includes a pair of pointers adjacent each end of each depicted winding pointing in opposite directions, illuminating means behind the panel in rear of each of said pointers for selectively illuminating each of said pointers, and separate electric circuits and means for alternately energizing the illuminating means to illuminate pointers which point in the same direction simultaneously with the illumination of one-half of the voltage curve, and then illuminate the pointers which point in the opposite direction simultaneously with the illumination of the other portion of the voltage curve.

3. Apparatus as claimed in claim 1 including a motor driven crank member and cable means connected to the crank and to the shutters for simultaneous progressive opening and closing movements thereof.

4. Apparatus as claimed in claim 3 including a driving motor, a pair of sweep lights operated thereby to sweep and illuminate the voltage curve progressively from one end to the other, a crank member journaled to rotate about a fixed axis relative to the panel, said shutters being disposed in pairs in spaced relation to each other, and pivoted at their edges in spaced relation to the rear of the panel to swing toward and away from each other around their pivots, a driving spool fixed to each shutter concentric to its pivot, an operating cable reversely wound about each pair of driving spools to simultaneously swing the free edges of the shutters of each pair toward and away from each other, the opposite ends of the cable being connected to the crank, pairs of electric lamps including a lighting circuit therefor, said lamps being disposed behind the panel intermediate the shutters and the panel for illuminating the lines of flux perforations, separate electric pointer lamps disposed in rear of the panel including electric circuits therefor for illuminating the pointers, relay means for connecting to the last mentioned circuits alternately closing the circuits to the pointer lamps which point in one direction when the relays are energized, and closing the circuits to the pointer lamps for the pointers which point in the opposite direction when the relays are de-energized, a relay energizing circuit including microswitch means connected therein for controlling the relay energizing circuit, a cam having a semicircular high portion engageable with the microswitch for closing the relay circuit and a semicircular low portion for disengaging the microswitch to open the relay circuit, and driving means between the cam and the driving motor for rotating the cam in synchronized relation to said crank.

5. In an elementary induction coil instruction device for visually presenting the principles and theory of flux in inductance coils, a supporting panel, a plurality of simulated electrical inductance coils mounted on the panel, including a pair of coils having simulated flux fields and mounted in axial alignment within the simulated electrical flux field of each other; a second pair of simulated coils having simulated flux fields and mounted in transverse alignment adjacent the simulated fields of each other; each coil having a simulated field winding and its simulated electrical flux field depicted on the panel; illuminating means located in back of the panel for illuminating the said flux fields; a pair of current direction indicating pointer devices carried by the panel adjacent each end of each of the simulated field windings of each of the coils and pointing in opposite directions, for indicating the direction of simulated current flow through each of the windings; power driven shutter means between the illuminating means and flux field for alternately interrupting and permitting illumination of said flux fields by said illuminating means in a predetermined timed relation, a pair of electrical energizing circuits, one of the energizing circuits including the illuminating means for illuminating the pointers pointing in one direction and the other circuit including the pointers pointing in the opposite direction; circuit closing contact means included in said circuits and means operated by the power driving means for actuating the shutter means, for alternately opening and closing each of the said circuit closing contact means in timed relation to the actuation of the shutter means for indicating the direction of simulated current flow through the winding and simultaneously depicting the simulated flux fields of said coils during said simulated current flow.

6. Apparatus as claimed in claim 5 in which the illuminating means for the flux fields includes a pair of electric lamps for illuminating each of the flux fields, one of said lamps of each pair being included in one of the energizing circuits for illuminating one set of pointers and the other lamp of each pair being included in the other energizing circuit for the other group of pointers, whereby the flux fields are illuminated and darkened alternately in timed relation to alternate illumination of the pointers by each of the lamps of the pair.

7. Apparatus as claimed in claim 6 including a voltage curve sine-wave depicted on the panel simulating one alternating current cycle and means operable by the shutter actuating means in timed relation to the movement of the shutter means for progressively illuminating one-half of the sine-wave during one opening and closing movement of the shutter means and then progressively illuminating the other half of the sine-wave during the following opening and closing movement of the shutter means.

HARRY M. TUCKER.

(References on following page)

REFERENCES CITED

The following references are of record in the file of this patent:

UNITED STATES PATENTS

| Number | Name | Date |
|---|---|---|
| 1,998,178 | Wallace | Apr. 16, 1935 |
| 2,084,302 | Wight | June 15, 1937 |
| 2,200,060 | Geiser | May 7, 1940 |
| 2,203,594 | Daugherty | June 4, 1940 |
| 2,236,217 | Manuel | Mar. 25, 1941 |
| 2,515,278 | Tucker | July 18, 1950 |

OTHER REFERENCES

"Specimens of Spectacular Electric Signs," Catalogue published by Reynolds Dull Flasher Co.; pages 2 and 16; 152 5th Avenue, Chicago, Illinois.